United States Patent [19]

Gautier et al.

[11] Patent Number: 5,056,412

[45] Date of Patent: Oct. 15, 1991

[54] BRAKE SERVOMOTOR ASSEMBLY MOUNTED ON A STATIONARY WALL OF A VEHICLE

[75] Inventors: Jean-Pierre Gautier; Guy Meynier, both of Aulnay Sous Bois, France

[73] Assignee: Bendix France, Drancy, France

[21] Appl. No.: 416,819

[22] Filed: Oct. 4, 1989

[30] Foreign Application Priority Data

Oct. 28, 1988 [FR] France ................... 88 14119

[51] Int. Cl.⁵ .......................................... B60T 13/46
[52] U.S. Cl. .................................. 91/368; 92/161; 92/169.1; 24/453; 24/590; 403/348; 403/349
[58] Field of Search ............ 403/348, 349, 319; 24/453, 590; 92/98 D, 128, 161, 146, 169.1; 91/368

[56] References Cited

U.S. PATENT DOCUMENTS

| 2,496,928 | 2/1950 | Bing et al. ............... 403/348 X |
| 4,286,159 | 8/1981 | Kitta et al. ............. 403/348 X |
| 4,475,337 | 10/1984 | Meynier ................... 60/547.1 |
| 4,725,029 | 2/1988 | Herve ..................... 403/348 X |
| 4,768,545 | 9/1988 | Hoffman .................. 92/128 X |
| 4,779,515 | 10/1988 | Staub ..................... 92/161 X |
| 4,779,516 | 10/1988 | Parker et al. ............ 92/161 X |
| 4,790,235 | 12/1988 | Gautier .................. 92/128 |
| 4,798,129 | 1/1989 | Staub ..................... 92/161 X |

FOREIGN PATENT DOCUMENTS

0148670 7/1985 European Pat. Off. .
0260170 3/1988 European Pat. Off. .

Primary Examiner—Edward K. Look
Assistant Examiner—George Kapsalas
Attorney, Agent, or Firm—Larry J. Palguta; Ken C. Decker

[57] ABSTRACT

The invention relates to a brake servomotor assembly (1) consisting of a front half-shell (6) and a rear half-shell (8) and mounted on a stationary part (4, 40) of a vehicle by means of lugs (54, 56, 154) arranged in a plane perpendicular to the axis of the servomotor and around this axis, extending radially outwards and cooperating with bearing surfaces (34, 36, 134) with corresponding shapes and dimensions for mounting by mechanism of axial engagement followed by rotation, an elastic means (25, 125) being arranged between the servomotor (1) and the stationary part (4,40), the servomotor (1) having a central hub (24) on the rear half-shell (8) comprising a control valve mechanism (26) of the servomotor (1). The lugs (154) or the bearing surfaces (34, 36) are formed as a single piece with the central hub (24) and cooperate respectively with the bearing surfaces (134) or the lugs (54, 56) formed on the stationary part (4, 40) of the vehicle.

9 Claims, 4 Drawing Sheets

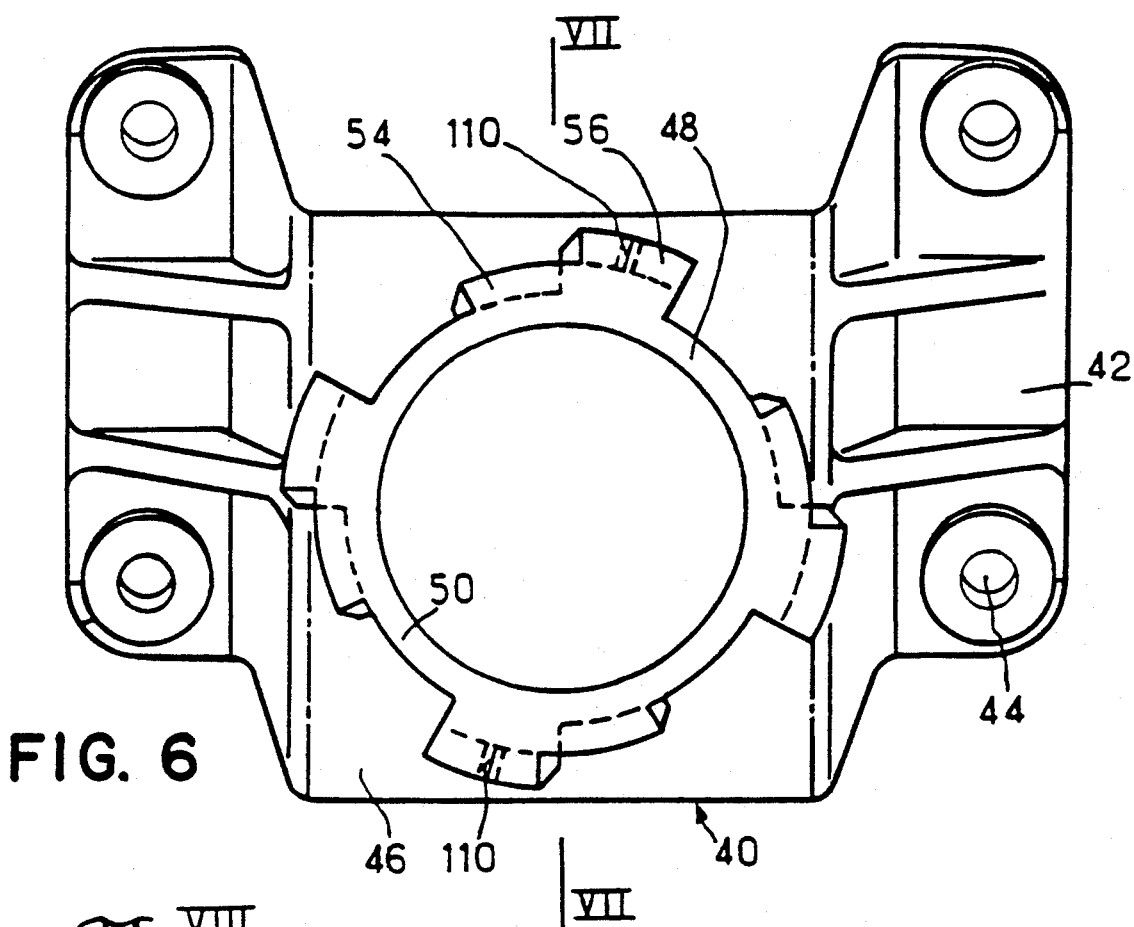
FIG. 6
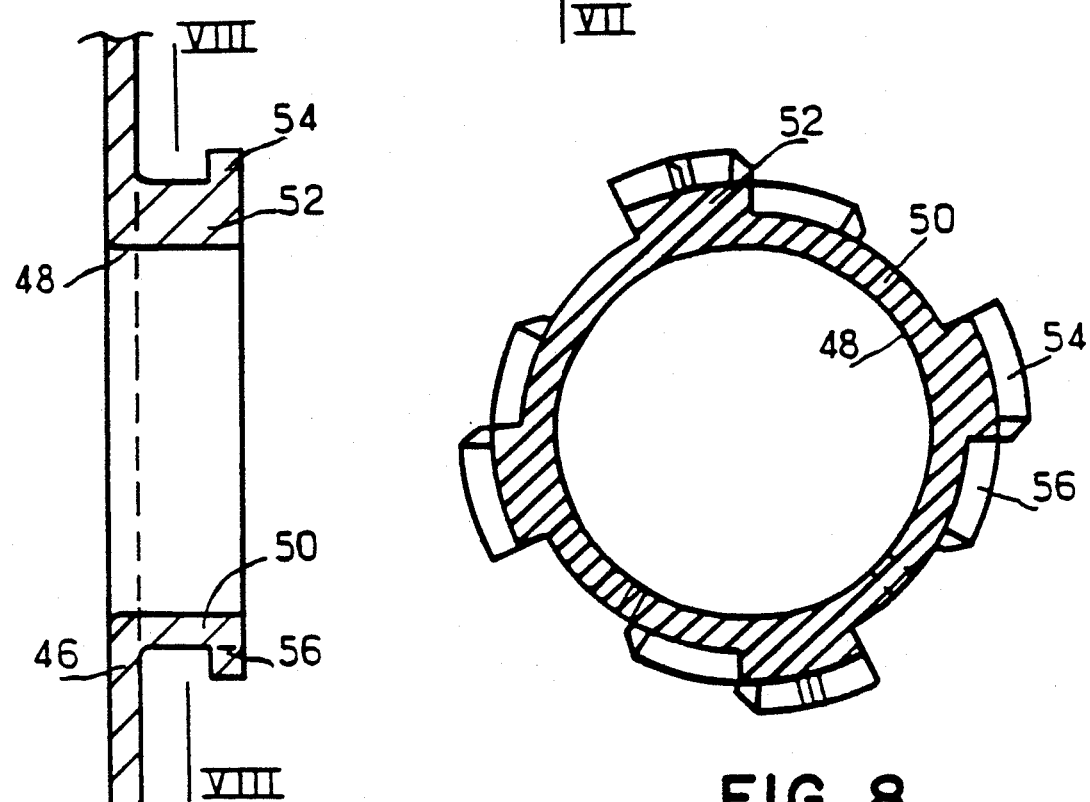
FIG. 7
FIG. 8

BRAKE SERVOMOTOR ASSEMBLY MOUNTED ON A STATIONARY WALL OF A VEHICLE

BACKGROUND OF THE INVENTION

The present invention relates to vehicle braking systems and more particularly to a brake servomotor assembly mounted on a stationary part of a vehicle.

Conventionally (see for example the document US-A-3,358,449), a brake servomotor is mounted on the stationary wall of a vehicle separating the engine compartment from the passenger compartment, by means of mounting bolts introduced from the engine side of the vehicle into corresponding orifices formed in the stationary wall, after which a nut is screwed onto the threaded end of each bolt projecting on the other side of the stationary wall, i.e. inside the passenger compartment.

The problems arising from the compact nature and dimensions of modern vehicles make it increasingly difficult to gain access to the rear side of the stationary wall, which is generally set far back underneath the dashboard in the vicinity of the central console of the latter and the pedal fittings, such that mounting the nut on the bolt is a long and difficult operation for the operator, which could result in cross-threading of the nut and/or the bolt and therefore could lead to an imperfect or even defective assembly.

In order to obviate these drawbacks, it was also proposed, in the document EP-A-0,260,170, that the orifice in the stationary wall of the vehicle should have an elongated configuration, typically substantially in the form of an arc of a circle, with a first end zone having an enlarged cross-section, through which the nut previously mounted on the threaded end of the bolt can pass, and joined to a second end zone of the orifice with a cross-section corresponding to that of the bolt.

With such an arrangement, the nut may be easily screwed onto the bolt in advance, before mounting in position, after which the bolt, with the pre-mounted nut, is engaged through the first end zone of the orifice, the servomotor then being manually made to perform a suitable movement, typically a rotation about its axis, so as to bring the bolt into the second end zone of the orifice, the nut then being screwed down on the latter by means of a suitable screw- or bolt-tightening device.

Although, according to this document, this overcomes the problems of mounting the nut, in situ, onto the bolt in the case where there is limited access to the servomotor mounting zone inside the passenger compartment, mounting of the servomotor still requires operations which are not only manual, but also must be performed inside the passenger compartment. A large number of the abovementioned drawbacks therefore still exist.

It was also proposed, in the document EP-A-0,148,670, to fix onto the apron of a motor vehicle separating the engine compartment from the passenger compartment a pedal support also used as a support for a pneumatic brake booster. For this purpose, the support has a cylindrical part passing through the apron and limited by an internal flange, which defines a circular orifice. This flange has formed on it recesses separated by bearing surfaces intended to cooperate with the same number of lugs projecting radially outside a ring fixed to the booster by pins. The booster is mounted on the support by axially engaging lugs of the ring into corresponding recesses in the flange, and then by rotating the booster so as to bring the lugs into engagement with the bearing surfaces. A sealing ring ensures that the engine compartment and the passenger compartment are sealed with respect to each other.

Although this document overcomes various drawbacks mentioned above, some of them still exist. In fact, the servomotor is fixed onto the support by means of a ring fixed onto its rear wall. Since the servomotor is subjected to considerable forces exerted by the brake pedal, it is necessary to arrange inside the servomotor, in order to fix the pins holding the ring, corresponding reinforcements so as to prevent the plate forming the rear wall being pulled off when the brake pedal is operated. This therefore results in a proportional increase in the weight of the servomotor.

Moreover, the servomotor is held in place, by means of mutual engagement of the lugs of the ring and the bearing surfaces of the support flange, only over limited surface zones. Consequently, the force exerted in the region of these surfaces will be considerable and will therefore increase the dimensions of the internal reinforcement.

Furthermore, when the servomotor is axially engaged into the circular orifice defined by the support flange, a considerable amount of play exists between the male and female parts such that exact positioning can only be achieved through trial and error, thereby excluding the possibility of automating installation of the servomotor using a programmed automation such as an assembly robot.

SUMMARY OF THE INVENTION

The object of the present invention, therefore, is to provide an assembly of the type considered, having means for mounting, in a rapid and reliable manner, an assembled servomotor onto a stationary part of a vehicle, according to a process which is entirely automated and ensures contact between the servomotor and the stationary part over an area which extends angularly through more than 180°.

To this end, according to a characteristic feature of the invention, there is provided a brake servomotor assembly consisting of a front half-shell and a rear half-shell and mounted on a stationary part of a vehicle by means of lugs arranged in a plane perpendicular to the axis of the servomotor and around this axis, extending radially outwards and cooperating with bearing surfaces with corresponding shapes and dimensions for mounting by means of axial engagement followed by rotation, an elastic means being arranged between the servomotor and the stationary part, the servomotor having a central hub on the rear half-shell comprising a control valve means of the servomotor, the lugs or the bearing surfaces being formed as a single piece with the central hub and cooperating respectively with the bearing surfaces or the lugs formed on the stationary part of the vehicle.

BRIEF DESCRIPTION OF THE DRAWINGS

The present invention will now be described with reference to the accompanying drawings in which:

FIG. 6 is a view of the support for the servomotor assembly according to FIG. 1, in the opposite direction to the arrow F of FIG. 1;

FIG. 7 is a section along the line VII—VII of FIG. 6 and

FIG. 8 is a section along the line VIII—VIII of FIG. 7.

DETAILED DESCRIPTION OF THE INVENTION

Figure 1:
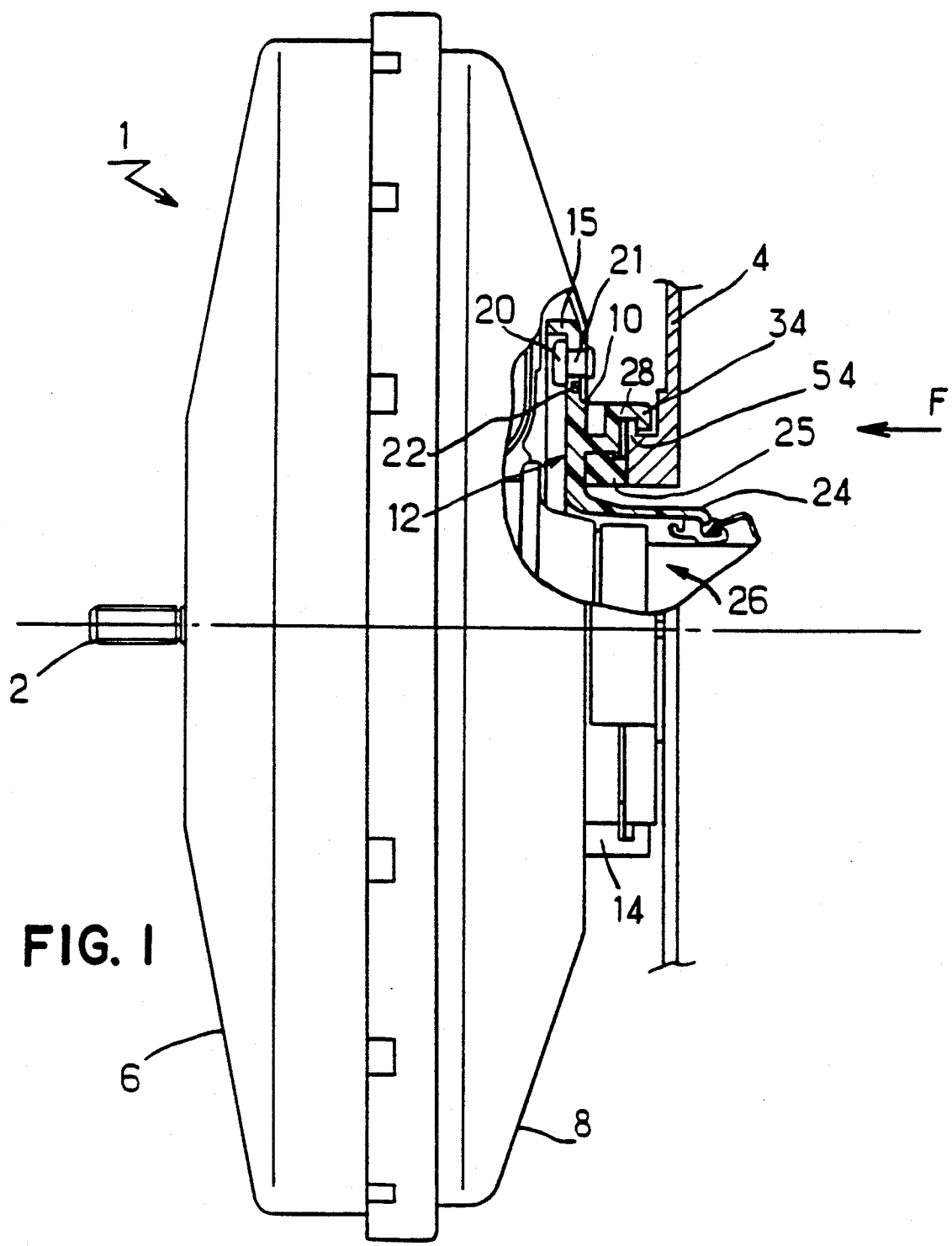
FIG. 1 is a partial sectioned view of a first embodiment of a servomotor assembly according to the invention.

FIG. 1 shows a conventional assembly of a vacuum-type brake servomotor assembly coupled to a brake master cylinder (not shown) by means of an actuating rod and mounted in cantilever fashion on the front side of a stationary wall 4 of a vehicle, typically the wall called the "firewall" or apron, separating the engine compartment from the passenger compartment.

In a known manner, the servomotor consists of two half-shells, a front half-shell 6 and a rear half-shell 8, sealably joined so as to form a casing inside which there moves a piston means dividing the internal volume of the casing into a front vacuum chamber and a rear working chamber selectively intercommunicating so as to supply the required boost to the braking action, when the brake pedal (not shown) is operated so as to act on the servomotor actuating rod through the central hub formed on the rear half-shell.

Conventionally, for example as in the case of the afore-mentioned documents, the servomotor is fixed to the apron by means of at least one bolt having a head integral with the rear half-shell of the servomotor and passing through an orifice formed in the apron, assembly being performed by means of a nut screwed onto the threaded end of the bolt projecting at the rear of the apron, this assembly operation having the drawbacks mentioned above.

According to the invention, this assembly operation is to be performed no longer by means of the rear half-shell, but instead by means of the piece forming the hub of the servomotor.

In FIG. 1 it can be seen that an opening 10 has been formed in the rear half-shell 8 of the servomotor 1, into which opening is inserted from the inside of the half-shell, a piece 12, the head 14 of which has an external shape matching that of the opening 10, for example a circular shape, and extends outside towards the rear of the half-shell 8. The piece 12 has a part 15 which is applied against the internal surface of the half-shell 8 and is rigidly joined to the latter by means of bolts or rivets 20 passing through corresponding orifices formed in the piece 1 and in the half-shell 8. A seal 22 is arranged between the part 15 of the piece 12 and the half-shell 8.

The piece 12 comprises moreover a cylindrical part 24 extending axially towards the rear of the servomotor and forming the hub of the latter, and comprising, in a known manner, a control valve means 26 actuated by an input rod (not shown) extending into the passenger compartment and intended to be coupled to a brake pedal (not shown).

The piece 12 comprises, finally, means intended for mounting the servomotor assembly on the vehicle apron. In the example shown, these means consist of projections 28 extending axially towards the rear of the servomotor, coaxially with the cylindrical part 24 and arranged around this part 24.

Figure 3:
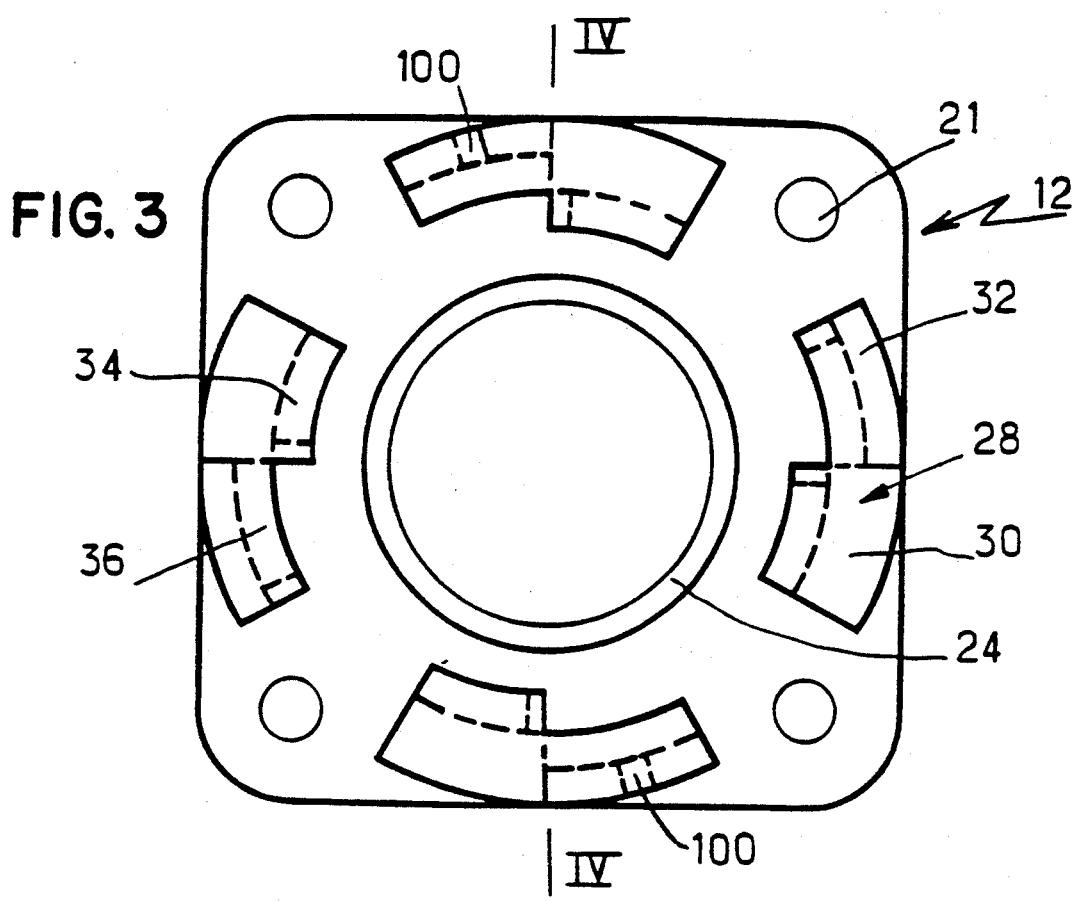
FIG. 3 is a view, in the direction of the arrow F of FIG. 1, of the piece forming the back of the servomotor assembly according to FIG. 1.
Figure 4:
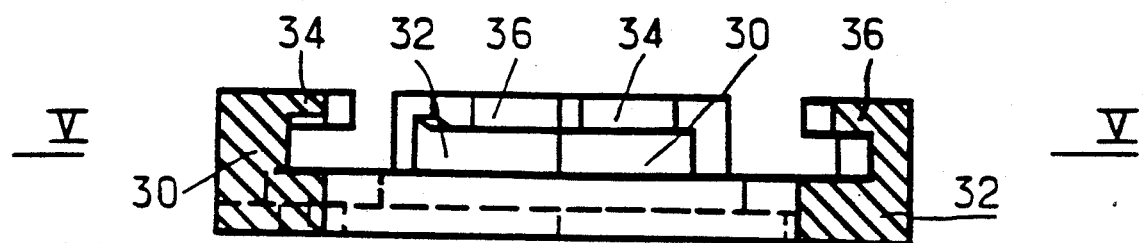
FIG. 4 is a section along the line IV—IV of FIG. 3.
Figure 5:
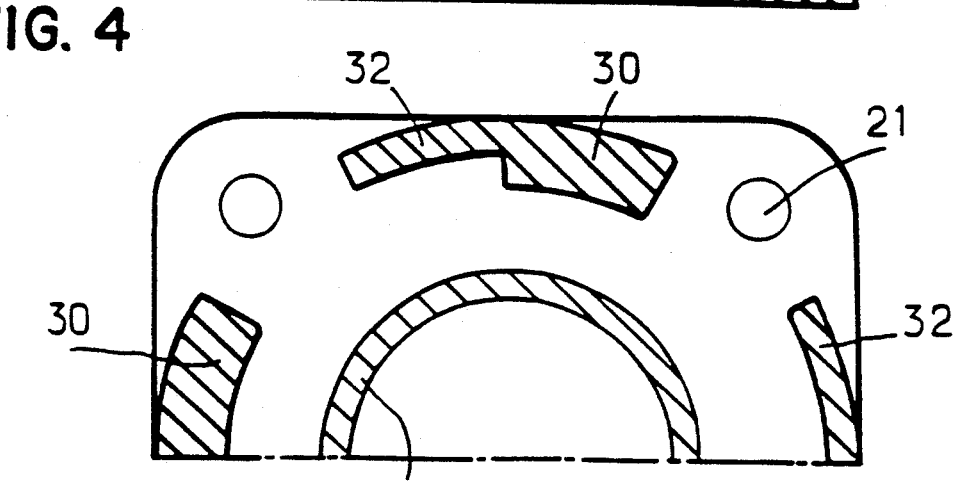
FIG. 5 is a half-section along the line V—V of FIG. 4.

The assembly piece 12 is shown in greater detail in FIGS. 3 to 5.

FIG. 3, where the assembly piece is viewed in the direction of the arrow F of FIG. 1, shows the orifices 21 formed in the periphery of the piece 12 and intended to receive the rivets for effecting fixing to the rear half-shell of the servomotor 1, as well as the cylindrical part 24 forming the servomotor hub. The axial projections 28 consist of portions of a cylinder which extend axially, perpendicularly relative to the plane of the piece 12, and one half 30 of which has a thickness double that of the other half 32 so that the external circumferences of the parts 30 and 32 are joined together in a discontinuous manner, and so that their internal circumferences have a stepped portion with a radial length equal to the thickness of the part 32 which is least thick.

The parts 30 and 32 of the axial projections 28 end in parts 34 and 36, respectively, extending radially inwards by an equal amount, so that the parts 34 and 36 have external circumferences joined together in a discontinuous manner, while their internal circumferences have a stepped portion with a length equal to that which exists between the parts 30 and 32. The parts 34 and 36 thus form offset bearing surfaces extending radially towards the inside of the axial projections 28.

These offset bearing surfaces 34 and 36 are intended to cooperate, when the servomotor is mounted on a stationary part of the vehicle, with lugs formed on the said stationary part. In FIG. 1, the lugs are formed directly on the apron 4 of the vehicle. These lugs may also be formed on an intermediate piece which will itself be fixed onto the apron of the vehicle. It is this latter example which is illustrated in FIG. 6, where a piece 40 can be seen, having a part 42 intended to be fixed onto the apron 4 of the vehicle by means of rivets or bolts (not shown) passing through orifices 44 in the part 42, and corresponding orifices in the apron, and a part 46 intended to receive the servomotor 1 provided with its mounting piece 12. The parts 42 and 46 may be situated in the same plane, in parallel planes or in concurrent planes, this choice depending on the orientation of the apron, the orientation which is to be given to the servomotor, the dimensions of the latter and the space available inside the engine compartment, etc.

In the example shown in FIG. 6, the parts 42 and 46 are in parallel planes. The part 46 has formed in it a circular opening 48 with a diameter greater than that of the cylindrical part 24 forming the hub of the servomotor 1, so that the latter is able to penetrate it freely. The part 46, or the apron 4 (FIGS. 1 and 7), have a cylindrical part 50, extending perpendicularly to its plane, the internal radius of which is equal to the radius of the opening 48 and the external surface of which has, arranged at regular intervals, portions 52 with a radius which is greater by an amount, for example, equal to the thickness of the part 50. On the cylindrical part 50, and more particularly on the portions 52 with a greater thickness, there are formed lugs 56 extending radially outwards, over a length equal to the thickness of the cylindrical part 50, and with the same angular dimension. Adjacent to these lugs 56, other lugs 54, arranged at regular intervals, with the same angular dimension and the same length as the lugs 56, are formed on the cylindrical part 50, these lugs therefore being offset, relative to the latter, towards the axis of the cylindrical part 50 by an amount equal, in the example shown, to the thickness of the cylindrical part 50.

It will be understood that the lugs 54 and 56, intended to cooperate respectively with the bearing surfaces 34 and 3 formed on the assembly piece 2, will have dimensions corresponding to those of these bearing surfaces. Thus, the radius of the lugs 56 will be slightly less than the internal radius of the parts 32, the radius of the lugs 54 will be slightly less than the internal radius of the parts 28, and the internal radius of the bearing surfaces 34 will be slightly greater than that of the cylindrical part 50. Similarly, the lugs 54 and 56, and the bearing surfaces 34 and 36, will extend over the same angular segment, i.e. 30° in the example shown.

When the servomotor 1 is mounted on the apron 4 or on an intermediate piece 40 fixed onto the apron 4, it is sufficient, after arranging a seal 25 on the piece 12, to position the assembled servomotor so that the lugs 54 and 56 penetrate inside the piece 12 and are located next to the bearing surfaces 34 and 36. A pressure applied to the servomotor in the opposite direction to that of the arrow F in FIG. 1 compresses the seal 25, after which rotation of the servomotor through 30° brings the lugs 54 and 56 into the vicinity of the bearing surfaces 34 and 36. When the pressure on the servomotor is released, the lugs 54 and 56 come into contact with the bearing surfaces 34 and 36 owing to the elastic action of the seal 25. It will be understood, therefore, that contact between the piece 12 and the apron 4 or the piece 40 is ensured, in the example shown, over eight zones of 30° each, i.e. over 240°. It is obviously possible to envisage providing, in the piece 12, bearing surfaces offset in three tiers, and corresponding lugs on the other piece, instead of two as shown. Positioning of the servomotor will again require a rotation through 30°, but contact will be established in this case over 270°. Similarly, with bearing surfaces offset in four tiers, contact will be established over 300°.

It is obvious that it is possible to vary the role of the bearing surfaces and the lugs, i.e. to provide the piece 12 with lugs which will engage over bearing surfaces formed on the apron 4 or the intermediate piece 40. It is this alternative which has been shown in FIG. 2, where the same elements have the same references as those in FIG. 1.

Figure 2:
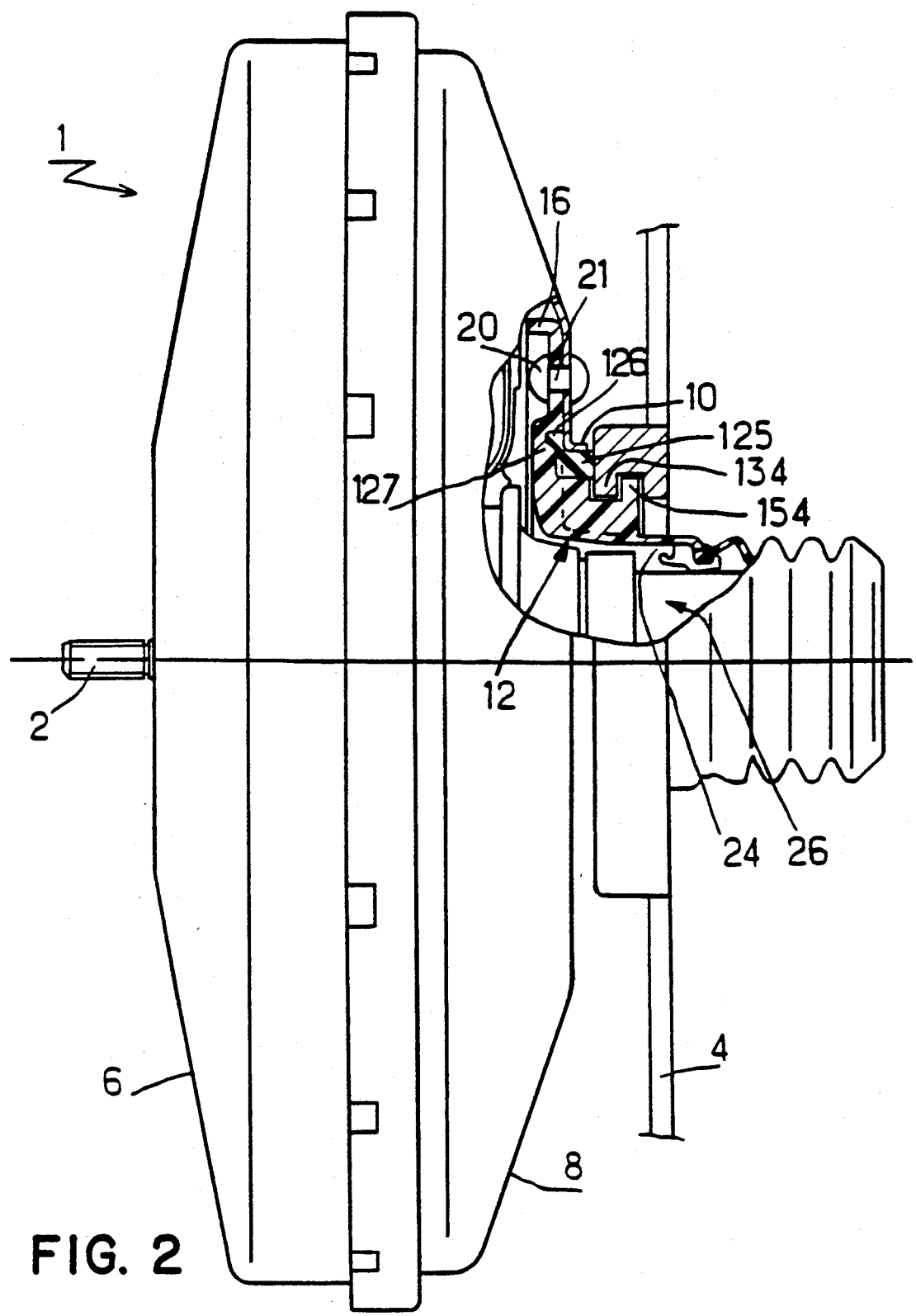
FIG. 2 is a similar view of a second embodiment of a servomotor assembly according to the invention.

In FIG. 2, it can be seen that the piece 12 has lugs 154 which, in this embodiment, are mounted on the cylindrical part 24 forming the hub of the servomotor, thus giving the piece 12 a more compact structure. The bearing surfaces 134 are thus formed on the stationary part of the vehicle and have corresponding shapes, so that the servomotor is mounted in the same manner as in the first embodiment, i.e. by means of axial engagement followed by rotation. Another advantage of this second embodiment is that it requires only one seal 125, instead of two in the embodiment of FIG. 1. Advantageously, the seal 125 is placed between the piece 12 and the half-shell 8 when the servomotor is assembled, and is held between them through gripping of a part 126 of the seal forming a nose, inside an annular groove 127 with a matching shape, provided in the piece 12.

Once assembly has been completed, the seal 25 or 125 keeps the lugs in contact with the corresponding bearing surfaces and thus fixes in rotation the servomotor, which therefore cannot accidentally come apart. If it is required to supplement this rotational locking, it is possible to provide, for example, bores 100 in the cylindrical parts 32 supporting the bearing surfaces 36 (FIG. 3), and corresponding bores 110 in the lugs 56 (FIG. 6) so that these bores are aligned when the servomotor 1 is in the correct position. A pin or key inserted into the bores 100 and 110 will thus prevent any relative movement between the servomotor and the stationary part of the vehicle on which it is mounted.

Numerous variations may be made to the invention by a person skilled in the art, without going outside the scope thereof. It is possible, for example, to use any rotational locking means, such as inclined ramps formed on the lugs and cooperating with corresponding inclined surfaces formed on the bearing surfaces. Similarly, it is possible to provide for the rear half-shell to be made as a single piece with the assembly piece on the stationary part.

What we claim is:

1. A brake servomotor assembly comprising a front half-shell and a rear half-shell and mounted on a stationary part of a vehicle by means of a lug/bearing surface attachment consisting of lugs arranged in a plane perpendicular to an axis of the servomotor and disposed around said axis to extend radially outwardly and cooperate with bearing surfaces with corresponding shapes and dimensions to effect mounting of the servomotor on the stationary part by means of axial engagement followed by rotation of the servomotor, elastic means arranged between the servomotor and stationary part, and a servomotor central hub at the rear half-shell and which extends axially and exteriorly of the rear half-shell, the hub including control valve means of the servomotor, and one of said lugs and bearing surfaces integral with the servomotor central hub and cooperating with an opposite one of said bearing surfaces and lugs integral with the stationary part of the vehicle.

2. The servomotor assembly according to claim 1, wherein said stationary part of the vehicle is an apron separating an engine compartment from a passenger compartment.

3. The servomotor assembly according to claim 1, wherein said stationary part of the vehicle consists of an intermediate piece fixed onto an apron separating an engine compartment from a passenger compartment.

4. The servomotor assembly according to claim 1, wherein said bearing surfaces consist of bearing surfaces offset in at least two tiers.

5. The servomotor assembly according to claim 4, tiers, each tier extending over an angular segment of 30°.

6. The servomotor assembly according to claim 1, wherein said lugs consist of parts offset in at least two tiers.

7. The servomotor assembly according to claim 6, wherein said bearing surfaces and said lugs consist of offset tiers, each tier extending over an angular segment of 30°.

8. The servomotor assembly according to claim 1, the assembly being in contact with the stationary part of the vehicle over an area which extends angularly through more than 180°.

9. The servomotor assembly according to claim 7, wherein said the area of contact between the servomotor and the stationary part of the vehicle extends angularly through 240°.

* * * * *